(12) United States Patent
Shinjo et al.

(10) Patent No.: US 7,441,322 B2
(45) Date of Patent: Oct. 28, 2008

(54) METHOD OF MANUFACTURING A MAGNETIC DETECTION APPARATUS

(75) Inventors: Izuru Shinjo, Tokyo (JP); Shigeki Tsujii, Tokyo (JP); Yoshinori Tatenuma, Tokyo (JP); Hiroshi Sakanoue, Tokyo (JP); Masahiro Yokotani, Tokyo (JP); Ryouichi Sasahara, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 29 days.

(21) Appl. No.: 11/536,106

(22) Filed: Sep. 28, 2006

(65) Prior Publication Data

US 2007/0163104 A1 Jul. 19, 2007

Related U.S. Application Data

(62) Division of application No. 10/704,672, filed on Nov. 12, 2003, now Pat. No. 7,117,585.

(30) Foreign Application Priority Data

Jul. 25, 2003 (JP) ............................... 2003-280313

(51) Int. Cl.
*G01R 3/00* (2006.01)
(52) U.S. Cl. ..................... 29/595; 29/593; 29/610.1; 29/737; 29/741; 324/166; 324/174; 324/207.21; 324/207.25; 338/28; 338/29; 338/30; 374/185
(58) Field of Classification Search ............... 29/592.1, 29/593, 595, 610.1, 827, 729, 740, 741, 612–614; 338/28–30; 374/185; 324/166, 174, 207.21, 324/207.25
See application file for complete search history.

(56) References Cited

U.S. PATENT DOCUMENTS 4,782,320 A * 11/1988 Shier .......................... 338/295

(Continued)

FOREIGN PATENT DOCUMENTS

DE 40 08 141 C2 9/1990

(Continued)

OTHER PUBLICATIONS

Kawaguchi, "Sensors and Crabbing for an In-pope Magnetic-wheeled Robot", Advanced Intelligent Mechatronics '97; Jun. 16-20, 1997; p. 119.

*Primary Examiner*—Paul D Kim
(74) *Attorney, Agent, or Firm*—Sughrue Mion, PLLC

(57) ABSTRACT

A magnetic detection apparatus can be improved in its product yield. The magnetic detection apparatus includes a resin compact having a the magnet arranged in opposition to an object to be detected for generating a magnetic field, an IC chip with a magnetic detection part built therein for detecting a change in the magnetic field in accordance with movement of the object to be detected, and an IC package in which a lead frame having the IC chip installed thereon is sealed with a resin. A method for manufacturing such a magnetic detection apparatus includes a signal adjustment step for adjusting a signal generated from the magnetic detection part in a state in which the magnetic field is applied to the magnetic detection part to correct a deviation of the signal of the magnetic detection part generated in accordance with a relative displacement between the magnetic detection part and the magnet.

3 Claims, 3 Drawing Sheets

U.S. PATENT DOCUMENTS

| | | | |
|---|---|---|---|
| 5,093,617 A | 3/1992 | Murata | |
| 5,218,279 A | 6/1993 | Takahashi et al. | |
| 5,365,768 A | 11/1994 | Suzuki et al. | |
| 5,483,156 A | 1/1996 | Nishihara | |
| 6,291,990 B1 | 9/2001 | Nakane et al. | |
| 6,427,316 B1 | 8/2002 | Shinjo et al. | |
| 6,534,978 B1 | 3/2003 | Treutler et al. | |
| 6,879,366 B2 * | 4/2005 | Takeishi et al. | 349/149 |
| 7,084,620 B2 * | 8/2006 | Tsujii et al. | 324/207.2 |
| 2003/0005391 A1 | 1/2003 | Matsumoto et al. | |
| 2004/0133829 A1 | 7/2004 | Hummel | |

FOREIGN PATENT DOCUMENTS

| | | |
|---|---|---|
| DE | 196 18 538 C2 | 4/1997 |
| DE | 198 43 350 A1 | 3/2000 |
| DE | 697 19 668 T2 | 3/2003 |
| DE | 600 12 112 T2 | 1/2005 |
| EP | 0 840 095 A1 | 5/1998 |
| JP | 56145319 A | 11/1981 |
| JP | 58-170043 A | 10/1983 |
| JP | 01-233315 A | 9/1989 |
| JP | 09-166612 A | 6/1997 |
| JP | 10-2757 | 1/1998 |
| JP | 10-148545 A | 6/1998 |
| JP | 2001-116815 A | 4/2001 |
| JP | 3235553 | 9/2001 |
| WO | 03/050481 A1 | 6/2003 |

* cited by examiner

METHOD OF MANUFACTURING A MAGNETIC DETECTION APPARATUS

CROSS REFERENCE

This is a divisional of application Ser. No. 10/704,672 filed Nov. 12, 2003, which claims priority to Japanese Application 2003-280313 filed Jul. 25, 2003. The entire disclosures of the prior applications is considered part of the disclosure of the accompanying continuation application and is hereby incorporated by reference.

BACKGROUND OF THE INVENTION

1. Field of the Invention

The present invention relates to a method of manufacturing a magnetic detection apparatus capable of detecting the rotation angle of a gear-wheel shaped magnetic rotor for instance. and it also relates to a magnetic detection apparatus obtained by such a method of manufacture.

2. Description of the Related Art

There has hitherto been known a magnetic detection apparatus including a magnet and an IC chip, which is arranged in the neighborhood of this magnet and has a magnetoresistive element incorporated therein, for detecting the rotation of a toothed magnetic rotor from a change in the magnetic field which is applied to a magnetic sensing element and is changing in accordance with the rotation of the toothed magnetic rotor arranged in the proximity of the magnetic detection apparatus (for instance, see a first patent document: Japanese patent No. 3235553).

In such a known magnetic detection apparatus, when a positional displacement takes place between the magnet and the magnetoresistive element incorporated into the IC chip in the manufacturing processes of the apparatus, such a displacement results in a variation in a bias magnetic field. In this case, if the variation is large, there will arise a problem that the output of the magnetoresistive element does not cross a comparison level or threshold, resulting in a defective product which fails to generate any pulse output.

SUMMARY OF THE INVENTION

Accordingly, the present invention is intended to obviate the above-mentioned problem, and has as its object to provide a method of manufacturing a magnetic detection apparatus with improved product yield.

Bearing the above object in mind, the present invention resides in a method of manufacturing a magnetic detection apparatus which includes: a resin compact having a magnet arranged in opposition to an object to be detected for generating a magnetic field; an IC chip with a magnetic detection part built therein for detecting a change in the magnetic field in accordance with a movement of the object to be detected; and an IC package in which a lead frame having the IC chip installed thereon is sealed with a resin. The method includes a signal adjustment step for adjusting a signal which is generated from the magnetic detection part in a state in which the magnetic field is applied to the magnetic detection part so as to correct a deviation of the signal of the magnetic detection part generated in accordance with a relative displacement between the magnetic detection part and the magnet.

In the above-mentioned method of manufacturing a magnetic detection apparatus according to the present invention, in order to correct a deviation of the signal output from the magnetic detection part generated in accordance with a relative displacement of the magnetic detection part and the magnet, provision is made for the signal adjustment step of adjusting the signal generated by the magnetic detection part with a magnetic field being applied to the magnetic detection part. As a result, it is possible to obtain the magnetic detection apparatus which is improved in its product yield.

The above and other objects, features and advantages of the present invention will become more readily apparent to those skilled in the art from the following detailed description of a preferred embodiment of the present invention taken in conjunction with the accompanying drawings.

DESCRIPTION OF THE PREFERRED EMBODIMENTS

Now, a preferred embodiment of the present invention will be described in detail while referring to the accompanying drawings.

Embodiment 1

Figure 1:
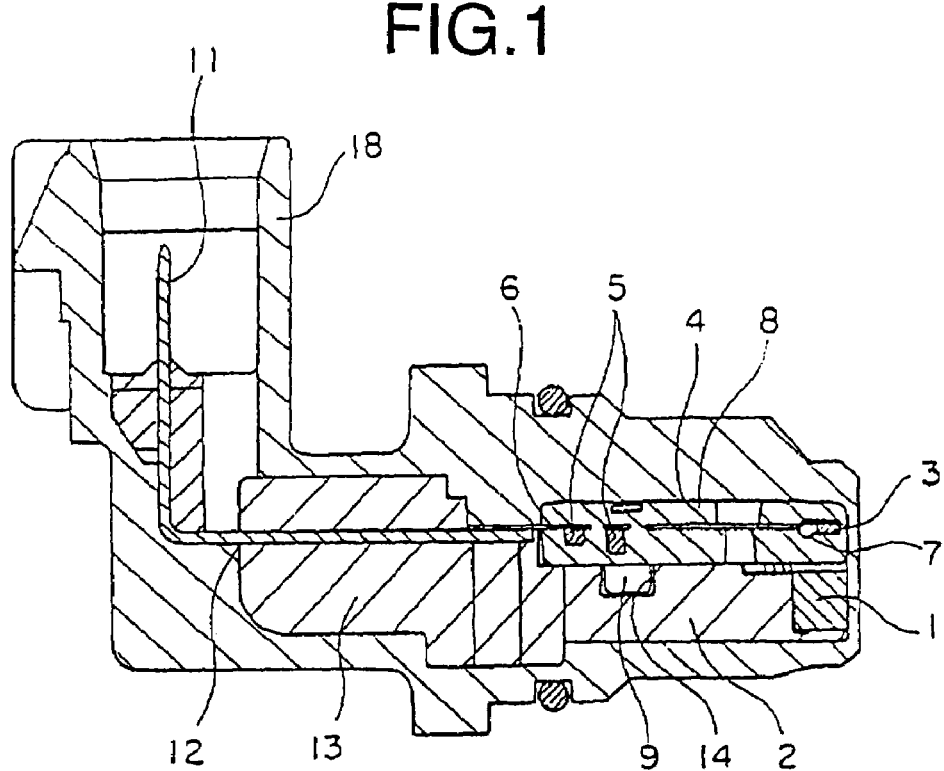
FIG. 1 is a cross sectional side view of a magnetic detection apparatus according to a first embodiment of the present invention.

FIG. 1 shows a cross sectional side view of a magnetic detection apparatus constructed in accordance with a first embodiment of the present invention.

The magnetic detection apparatus includes a resin mold or compact 2 having a magnet 1 arranged in opposition to an object to be detected in the form of a toothed magnetic rotor with concave and convex portions (not shown) for generating a magnetic field, an IC package 4 having an IC chip 3 built therein, into which a magnetic detection part in the form of magnetoresistive elements is incorporated for detecting a change in the magnetic field generated by the magnet 1 and changing in accordance with the rotation of the magnetic rotor, and an exterior resin 18 with which the IC package 4 and the resin compact 2 are resin-sealed.

The IC package 4 includes chip parts 5 such as resistances, capacitors, etc., which form a protection circuit against external noise, a first non-magnetic lead frame 6 with which the chip parts 5 and the IC chip 3 are electrically connected by soldering, a gold wire 7 electrically connecting prescribed terminals to be described later with one another, and a first resin portion 8 with which the IC chip 3, the chip parts 5 and the first lead frame 6 are resin-sealed by insert molding.

Figure 2:
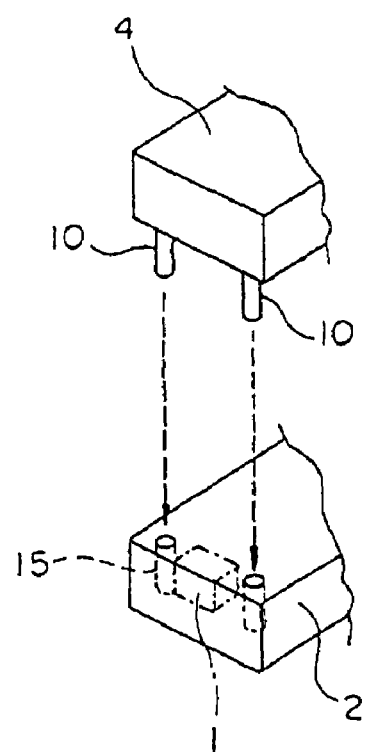
FIG. 2 is a partially exploded perspective view of an IC package and a resin compact of FIG. 1.

A protruded press-fit portion 9 is formed on a lower surface of the first resin portion 8, and a pair of pins 10, which protrudes in the same direction as the press-fit portion 9 does as shown in FIG. 2, are also formed on the lower surface of the first resin portion 8.

Figure 3:
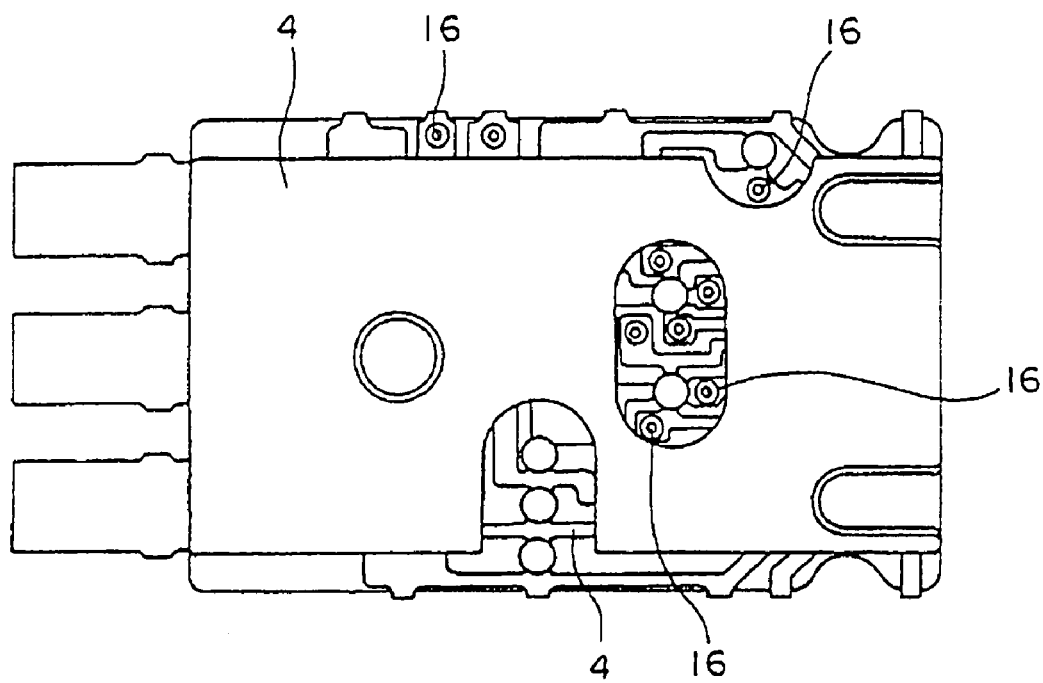
FIG. 3 is a plan view of the IC package of FIG. 1.
Figure 4:
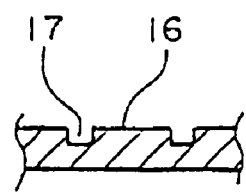
FIG. 4 is a cross sectional view of the neighborhood of a probing portion of FIG. 2.

A plurality of probing portions 16 are provided on adjustment terminals of the first lead frame 6, as shown in FIG. 3 and FIG. 4, and a plurality of grooves 17, acting as an infiltration preventive part for preventing a resin from infiltrating the probing portions 16, are formed to surround the probing portions 16, respectively.

The resin compact 2 includes a second lead frame 12 electrically connected by welding with the first lead frame 6 and having a connector terminal 11 for outputting an output signal of the magnetoresistive elements to an external member, and a second resin portion 13 with which the second lead frame 12 is resin-sealed by insert molding. In addition, on an upper surface of the second resin portion 13, there is formed a concave portion 14 into which the press-fit portion 9 is press-fitted. Also, on the upper surface of the second resin portion 13, there are formed a pair of holes 15 into which the pins 10 are fitted, as shown in FIG. 2. The pins 10 and the press-fit portion 9 of the IC package 4 as well as the holes 15 and the concave portion 14 of the resin compact 2 together constitute a positioning and integrating part which determines the relative position between the IC package 4 and the resin compact 2 and combines them into an integral unit.

In the magnetic detection apparatus as constructed above, the concave portions and convex portions of the magnetic rotating member arranged at a location near the apparatus alternately come into the proximity of the magnetoresistive elements built into the IC chip 3 in accordance with the rotation of the magnetic rotating member, so that the magnetic field from the magnet 1 applied to the magnetoresistive elements is changed. Such a change in the magnetic field is detected by the magnetoresistive elements as a change in its resistance. The change in the resistance generated in the magnetoresistive elements is sent to a computer unit (not shown) through the connector terminal 11, whereby the number of revolutions per minute of the magnetic rotating member is detected by the computer unit.

Now, a method of manufacturing the magnetic detection apparatus as constructed above will be explained below.

First of all, the characteristic variation of the magnetoresistive elements is first adjusted. Such an adjustment has been done even in the above-mentioned known magnetic detection apparatus, and here is also carried out with respect to the IC chip 3 into which the magnetoresistive elements are built. The number of probe portions needed for signal adjustment in the post processing is reduced by this adjustment process.

Here, the adjustment of the characteristic variation of the magnetoresistive elements will be explained in detail.

Figure 5:
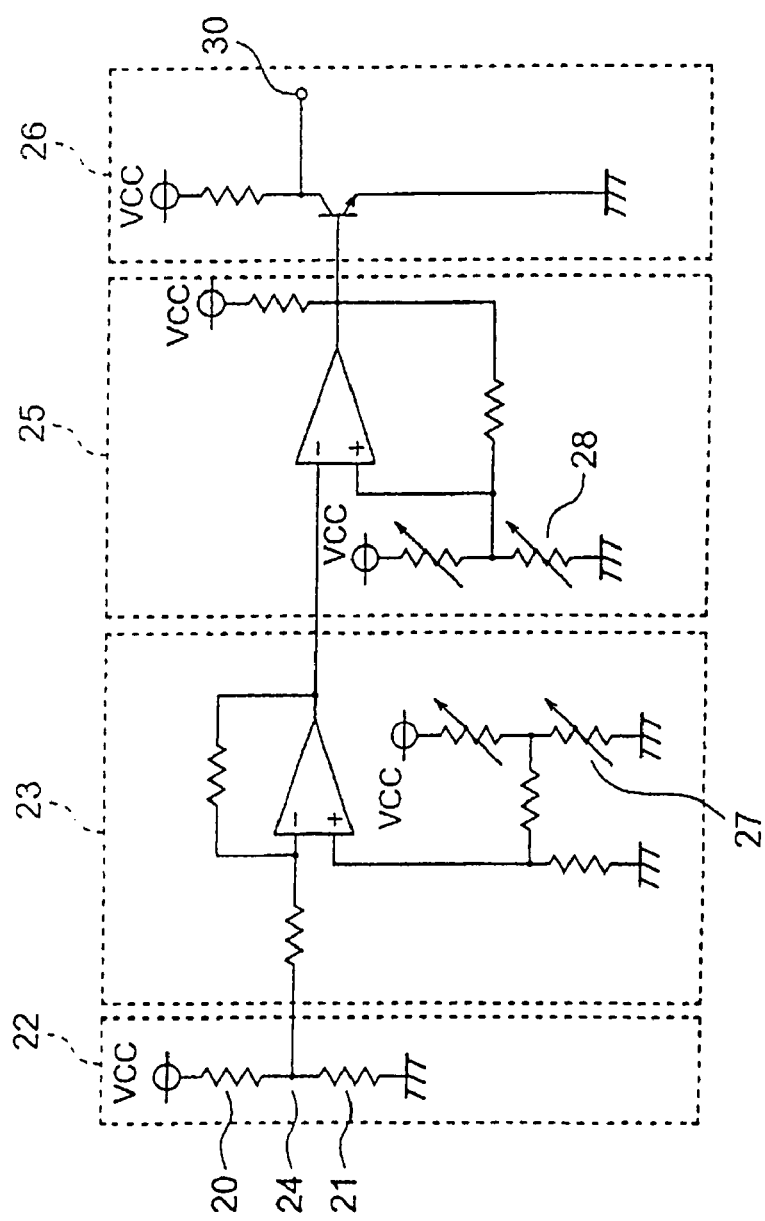
FIG. 5 is an electric circuit diagram of the magnetic detection apparatus according to the first embodiment of the present invention.

FIG. 5 is a circuit diagram of the magnetic detection apparatus. A bridge circuit 22 comprising a first magnetoresistive element 20 and a second magnetoresistive element 21 is connected with a differential amplifier circuit 23. The differential amplification circuit 23 performs prescribed amplification of the voltage generated in a midpoint 24 in the bridge circuit 22 and generates it as an output. The output of the differential amplifier circuit 23 is converted into a two-level signal in a comparison circuit 25, which is finally output as a pulse wave from an output terminal 30 through an output circuit 26. At this time, if there is a difference between the resistance values of the first magnetoresistive element 20 and the second magnetoresistive element 21, this difference is amplified, resulting in a situation where the output of the differential amplifier circuit 23 does not cross a comparison level or threshold of the comparison circuit 25.

In order to avoid such a situation, a reference voltage of the differential amplifier circuit 23 is adjusted. Concretely, by adjusting the resistance value of a resistance adjustment portion 27 of the differential amplifier circuit 23 that determines the reference voltage thereof, the characteristic variations of the first magnetoresistive element 20 and the second magnetoresistive element 21 are adjusted.

After the adjustment of the characteristic variations of the first magnetoresistive element 20 and the second magnetoresistive element 21 has been completed, the IC chip 3 and the chip parts 5 are installed on the first non-magnetic lead frame 6, and the prescribed terminals thereof are mutually connected with one another by the gold wire 7, whereafter they are resin-sealed by the first resin portion 8 to produce the IC package 4. The purpose of using the first lead frame 6 of a non-magnetic material is to prevent the scattering of magnetic field.

Then, the IC package 4 thus produced is assembled to the resin compact 2. At this time, the press-fit portion 9 and the pins 10 of the IC package 4 are fitted into the concave portion 14 and the holes 15 of the resin compact 2, respectively, whereby the IC package 4 and the resin compact 2 are integrally coupled with each other so as not to generate play or rattle therebetween. In this connection, it is to be noted that with respect to the positioning and integration of the IC package 4 and the resin compact 2, the present invention is not particularly limited to the above arrangement and construction as long as they are properly positioned and integrated in a reliable manner.

Subsequently, in order to correct a deviation of the output signal generated from the output terminal 30 in accordance with a relative displacement between the magnetoresistive elements of the IC package 4 and the magnet 1 of the resin compact 2, an adjustment is carried out again.

Specifically, the resistance value of a resistance adjustment portion 28 that determines the comparison level of the comparison circuit 25 is adjusted for this purpose. In this regard, both the resistance adjustment portion of this comparison circuit 25 and the resistance adjustment portion 27 of the aforementioned differential amplifier circuit 23 are resistance adjustment portions in the IC chip 3. Thus, by performing the resistance adjustment of these resistance adjustment portions, any additional resistance adjustment part such as, for instance, a trimmable resistor or the like is not needed, thereby ensuring the reduction in size of the apparatus.

Here, the Zener-zapping technique is employed as an adjustment means for the resistance adjustment portion 28. The Zener-zapping technique is a technique of short-circuiting a resistor by causing electric current to flow through a transistor arranged in parallel to the resistor through the probing portions 16. That is, the resistance value of the resistor exists in the absence of such adjustment, but it becomes possible to make the resistance value to zero by performing the above adjustment.

In the Zener-zapping technique, adjustment can be made by causing the electric current to flow between the probing portions 16, so there is no necessity to expose the resistance adjustment portion 28, and hence it is possible to adjust the resistance value of the resistance adjustment portion 28 while the IC chip 3 is sealed with a resin material.

In general, the resin material for sealing the IC chip 3 is an epoxy resin, which has very high flowability, and hence portions wanted to be exposed are sometimes coated with such an resin, depending on the thickness variation and molding conditions of the first lead frame 6. Thus, if the probing portions 16 are coated with the resin, it becomes, of course, impossible to cause electric current to flow through the probing portions 16, so the resistance adjustment in the IC chip 3 can not be made.

In this case, however, the grooves 17, being formed around the probing portions 16, respectively, serve to prevent the resin from coming into the probing portions 16, whereby exposure of the probing portions 16 is ensured, thus making it possible to perform stable resistance adjustment.

In methods such as, for instance, a laser cutting method, etc., other than the Zener-zapping technique, it is necessary to expose the surface of the IC chip 3 to the outside so as to directly cut the wiring of the IC chip 3. In addition, in this case, it is also necessary to pay attention to short-circuiting due to dust, corrosion due to humidity or the like.

Thereafter, an end portion of the first lead frame 6 of the IC package 4 is connected by welding with an end portion of the second lead frame 12 of the resin compact.

Finally, the IC package 4 and the resin compact 2 thus integrated are sealed with a resin by means of insert molding with the connector terminal 11 being exposed, whereby a magnetic detection apparatus with its outer surface covered with the exterior resin 18 is produced.

Figure 6:
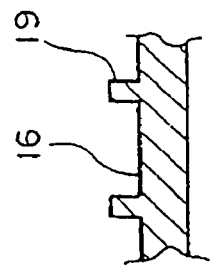
FIG. 6 is a cross sectional view showing another example of the neighborhood of the probing portion.

Although in the above-mentioned embodiment, reference has been made to the case in which the grooves 17 are provided as an infiltration preventive part, a wall 19 may instead be formed to surround each of the probing portions 16, as shown in FIG. 6. Such a wall 19 can be formed by performing plating, applying a resin, pasting a seal or the like.

In addition, although in the above embodiment, the magnetoresistive elements 20, 21 have been used as the magnetic detection part, the magnetic detection part is, of course, not limited to such magnetoresistive elements but may comprise a hall element capable of converting a change in the magnetic field into a corresponding voltage.

While the invention has been described in terms of a preferred embodiment, those skilled in the art will recognize that the invention can be practiced with modifications within the spirit and scope of the appended claims. *

What is claimed is:

1. A method of manufacturing a magnetic detection apparatus which includes;
    a resin compact having a magnet, arranged in opposition to an object to be detected, for generating a magnetic field;
    an IC chip with a magnetic detection part built therein for detecting a change in said magnetic field in accordance with a movement of said object to be detected; and
    an IC package in which a lead frame having said IC chip installed thereon is sealed with a resin;
    said method comprising a signal adjustment step of adjusting a signal which is generated from said magnetic detection part in a state in which said magnetic field is applied to said magnetic detection part so as to correct a deviation of the signal of said magnetic detection part generated in accordance with a relative displacement between said magnetic detection part and said magnet,
    wherein in said signal adjustment step, the resistance values of resistance adjustment portions built into said IC chip are adjusted.

2. The method of manufacturing a magnetic detection apparatus as set forth in claim 1, further comprising and integration step for combining IC package and said resin compact with each other to form an integral unit, said integration step being followed by said signal adjustment step.

3. The method of manufacturing a magnetic detection apparatus as set forth in claim 1, wherein the adjustment of said resistance adjustment portions is carried out by the Zener-zapping technique.

* * * * *